US011937070B2

(12) United States Patent
Tian et al.

(10) Patent No.: US 11,937,070 B2
(45) Date of Patent: Mar. 19, 2024

(54) LAYERED DESCRIPTION OF SPACE OF INTEREST

(71) Applicant: Tencent America LLC, Palo Alto, CA (US)

(72) Inventors: Jun Tian, Belle Mead, NJ (US); Xiaozhong Xu, State College, PA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 86 days.

(21) Appl. No.: 17/751,425

(22) Filed: May 23, 2022

(65) Prior Publication Data

US 2023/0007425 A1 Jan. 5, 2023

Related U.S. Application Data

(60) Provisional application No. 63/217,442, filed on Jul. 1, 2021.

(51) Int. Cl.
*H04S 7/00* (2006.01)
*G10L 19/16* (2013.01)

(52) U.S. Cl.
CPC ............ *H04S 7/303* (2013.01); *G10L 19/167* (2013.01); *H04S 2400/11* (2013.01)

(58) Field of Classification Search
CPC ..... H04S 7/303; H04S 2400/11; G10L 19/167
USPC .......................................................... 381/303
See application file for complete search history.

(56) References Cited

U.S. PATENT DOCUMENTS

| | | | |
|---|---|---|---|
| 2013/0077631 A1 | 3/2013 | Lee et al. |
| 2014/0301463 A1 | 10/2014 | Rusanovskyy et al. |
| 2015/0016515 A1 | 1/2015 | Naccari et al. |
| 2015/0373327 A1 | 12/2015 | Zhang et al. |
| 2018/0160132 A1 | 6/2018 | Hendry et al. |

(Continued)

FOREIGN PATENT DOCUMENTS

| | | |
|---|---|---|
| RU | 2641252 C2 | 1/2018 |
| RU | 2678490 C2 | 1/2019 |

(Continued)

OTHER PUBLICATIONS

Extended European Search Report in EP22834361.2, dated Dec. 4, 2023, 13 pages.

*Primary Examiner* — Paul Kim
(74) *Attorney, Agent, or Firm* — ARENTFOX SCHIFF LLP

(57) ABSTRACT

Aspects of the disclosure provide methods and apparatuses for audio processing. In some examples, an apparatus for media processing includes processing circuitry. The processing circuitry receive audio inputs associated with a layered description for a space of interest in an audio scene. The space of interest includes a plurality of subspaces. The layered description includes a first layer and a second layer. The first layer has a common node with a first value that is a common attribute value of two or more subspaces in the plurality of subspaces. The second layer has individual nodes respectively associated with each of the plurality of subspaces. The processing circuitry determines the plurality of subspaces of the space of interest based on the layered description, and renders an audio output based on the audio inputs in response to a location of a subject of the audio scene being in the space of interest.

20 Claims, 14 Drawing Sheets

(56) References Cited

U.S. PATENT DOCUMENTS

| | | | | |
|---|---|---|---|---|
| 2018/0324420 | A1 | 11/2018 | Wang et al. | |
| 2020/0273249 | A1* | 8/2020 | Leppänen | G06F 3/165 |
| 2020/0322743 | A1* | 10/2020 | Cengarle | H04S 1/002 |

FOREIGN PATENT DOCUMENTS

| | | | |
|---|---|---|---|
| WO | 2020008890 | A1 | 1/2020 |
| WO | 2020201620 | A1 | 10/2020 |

* cited by examiner

```
<SpaceOfInterest>
<Box id="box:Box1" position="-15.88 1.29 -11.78" orientation="-27.56 0.00 0.00" size="29.66 2.50 20.47" />
<Box id="box:Box2" position="-31.47 1.29 -24.53" orientation="-39.25 0.00 0.00" size="19.23 2.50 12.03" />
<Box id="box:Box3" position="-32.16 1.29 -40.51" orientation="-100.85 0.00 0.00" size="19.23 2.50 12.03" />
<Box id="box:Box4" position="-25.84 1.29 -56.44" orientation="-100.85 0.00 0.00" size="19.23 2.50 22.39" />
</SpaceOfInterest>
```

401

402

403

404

FIG. 4

600

611 612 610

```
<SpaceOfInterest>
        <Common name="size" value="20.0 2.50 15.0"/>
<Box id="box:Box1" position="-15.88 1.29 -11.78" orientation="-27.56 0.00 0.00"/>
<Box id="box:Box2" position="-31.47 1.29 -24.53" orientation="-39.25 0.00 0.00" />
<Box id="box:Box3" position="-32.16 1.29 -40.51" orientation="-100.85 0.00 0.00" />
<Box id="box:Box4" position="-25.84 1.29 -56.44" orientation="-100.85 0.00 0.00" />
</SpaceOfInterest>
```

620

FIG. 6

700

710

711 712 713

720

```
<SpaceOfInterest>
  <common name=name_1 index=" ... " value=" ... "/>
  <common name=name_2 index=" ... " value=" ... "/>
  ...
  <common name=name_m index=" ... " value=" ... "/>
  <Box id=id1 Attribute_b1_1=Valueb11 Attribute_b1_2=Value_b1_2 .../>
  <Box id=id2 Attribute_b2_1=Valueb21 Attribute_b2_2=Value_b2_2 .../>
  .....
  <Box id=idn Attribute_bn_1=Valuebn1 Attribute_bn_2=Value_b_n_2 .../>
</SpaceOfInterest>
```

FIG. 7

800

811 813 812

```
<SpaceOfInterest>
        <Common name="orientation" index="2 3"  value ="0.00 0.00"/>
        <Common name="size" index="2" value="2.50"/>
<Box id="box:Box1" position="-15.88 1.29 -11.78" orientation="-27.56" size="29.66 20.47" />
<Box id="box:Box2" position="-31.47 1.29 -24.53" orientation="-39.25" size="19.23 12.03" />
<Box id="box:Box3" position="-32.16 1.29 -40.51" orientation="-100.85" size="19.23 12.03" />
<Box id="box:Box4" position="-25.84 1.29 -56.44" orientation="-100.85" size="19.23 22.39" />
</SpaceOfInterest>
```

810

820

*FIG. 8*

900

```
<SpaceOfInterest>
    <Common name="orientation" index="2 3"  value ="0.00 0.00"/>
    <Common name="size" index="1 2" value="19.23 2.50"/>
<Box id="box:Box1" position="-15.88 1.29 -11.78" orientation="-27.56" size="29.66 2.50 20.47" />
<Box id="box:Box2" position="-31.47 1.29 -24.53" orientation="-39.25" size="12.03" />
<Box id="box:Box3" position="-32.16 1.29 -40.51" orientation="-100.85" size="12.03" />
<Box id="box:Box4" position="-25.84 1.29 -56.44" orientation="-100.85" size="22.39" />
</SpaceOfInterest>
```

910

921

920

FIG. 9

1000

```
<SpaceOfInterest>
        <Common name=”orientation” index=“2 3”  value ="0.00 0.00"/>
        <Common name=”size” index=”1 2” value=”19.23 2.50”/>
<Box id="box:Box1" position="-15.88 1.29 -11.78" orientation="-27.56" size="10.43 0.00 20.47" />
<Box id="box:Box2" position="-31.47 1.29 -24.53" orientation="-39.25" size="12.03" />
<Box id="box:Box3" position="-32.16 1.29 -40.51" orientation="-100.85" size="12.03" />
<Box id="box:Box4" position="-25.84 1.29 -56.44" orientation="-100.85" size="22.39" />
</SpaceOfInterest>
```

1010

1021

1020

*FIG. 10*

LAYERED DESCRIPTION OF SPACE OF INTEREST

INCORPORATION BY REFERENCE

This present disclosure claims the benefit of priority to U.S. Provisional Application No. 63/217,442, "Layered Description of Space of Interest" filed on Jul. 1, 2021, which is incorporated by reference herein in its entirety.

TECHNICAL FIELD

The present disclosure describes embodiments generally related to audio processing.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

In an application of virtual reality or augmented reality, to make a user have the feeling of presence in the virtual world of the application, audio in a virtual scene of the application is perceived as in real world, with sounds coming from associated virtual figures of the virtual scene. In some examples, physical movement of the user in the real world is perceived as having matching movement in the virtual scene in the application. Further, and importantly, the user can interact with the virtual scene using audio that is perceived as realistic and matches the user's experience in the real world.

SUMMARY

Aspects of the disclosure provide methods and apparatuses for audio processing. In some examples, an apparatus for media processing includes processing circuitry. The processing circuitry receive audio inputs associated with a layered description for a space of interest in an audio scene. The space of interest includes a plurality of subspaces. The layered description includes a first layer and a second layer. The first layer has a common node with a first value that is a common attribute value of two or more subspaces in the plurality of subspaces. The second layer has individual nodes respectively associated with each of the plurality of subspaces. The processing circuitry determines the plurality of subspaces of the space of interest based on the layered description, and renders an audio output based on the audio inputs in response to a location of a subject of the audio scene being in the space of interest.

In some examples, the plurality of subspaces are rectangular boxes that are defined by at least a position attribute, an orientation attribute and a size attribute.

According to some aspects of the disclosure, the common node identifies a name for an attribute, and the first value is an attribute value of the attribute, and the processing circuitry can retrieve, from the common node in the first layer, the first value as the attribute value of the attribute for a subspace in the plurality of subspaces.

According to some aspects of the disclosure, the common node identifies a name of an attribute and an index of a subfield of the attribute, and the first value is a subfield attribute value for the subfield of the attribute, and the processing circuitry retrieves, from the common node in the first layer, the first value as the subfield attribute value for the subfield of the attribute of a subspace in the plurality of subspaces.

In some examples, the common node with the first value is common to the plurality of subspaces, and the processing circuitry retrieves, from the common node in the first layer, the first value as an attribute value of an attribute for each of the plurality of subspaces.

In some examples, the common node with the first value is common to a subset of the plurality of subspaces. The processing circuitry retrieves, from the common node in the first layer, the first value as an attribute value of an attribute for a first subspace in response to a first individual node associated with the first subspace missing a value for the attribute. Further, the processing circuitry retrieves, from a second individual node associated with a second subspace, a second value associated with the attribute for the second subspace in response to an existence of the second value associated with the attribute in the second individual node.

In some examples, the common node with the first value is common to a subset of the plurality of subspaces. The processing circuitry retrieves, from the common node in the first layer, the first value as an attribute value of an attribute of a first subspace in response to a first individual node associated with the first subspace missing a value for the attribute. Further, the processing circuitry retrieves, from a second individual node associated with a second subspace, a difference value associated with the attribute of the second subspace, and computes a second value for the attribute of the second subspace based on the first value and the difference value.

In some examples, the processing circuitry receives a bitstream carrying the audio inputs and the layered description of the space of interest as metadata of the audio inputs, and decodes the bitstream to obtain the audio inputs and the layered description of the space of interest.

In some examples, the processing circuitry ignores the audio inputs without rendering in response to the location of the subject of the audio scene being outside of the space of interest.

Aspects of the disclosure also provide a non-transitory computer-readable medium storing instructions which when executed by a computer cause the computer to perform the method for audio processing.

BRIEF DESCRIPTION OF THE DRAWINGS

Further features, the nature, and various advantages of the disclosed subject matter will be more apparent from the following detailed description and the accompanying drawings in which:

FIG. 4 shows a description for a space of interest in the canyon scene.

FIG. 6 shows a layered description for a space of interest in some examples.

FIG. 7 shows a syntax for a layered description of a space of interest according to an embodiment of the disclosure.

FIG. 8 shows a layered description for a space of interest in some examples.

FIG. 9 shows a layered description for a space of interest in some examples.

FIG. 10 shows a layered description for a space of interest in some examples.

DETAILED DISCRETION OF EMBODIMENTS

Aspects of the disclosure provide description techniques for a space of interest of an audio scene. Specifically, the description techniques can provide a layered description of a space of interest in an audio scene. The layered description of the space of interest in the audio scene can provide compacted information of the space of interest for audio coding, transmission and rendering.

Generally, an audio scene is a semantically consistent sound segment that is characterized by a few dominant sources of sound. Thus, the audio scene can be modeled as a collection of sound sources. In some examples, the audio scene is dominated by a few of the collection of sound sources. A space of interest in the audio scene can be defined by borders of the space of interest under consideration in the audio scene. The space of interest of the audio scene can be utilized in audio coding, processing, rendering, and the like.

According to some aspects of the disclosure, some technologies attempt to create, or imitate the physical world through digital simulation that is referred to as immersive media. Immersive media processing can be implemented according an immersive media standard, such as Moving Picture Expert Group Immersive (MPEG-I) suite of standards, including “immersive audio”, “immersive video”, and “systems support.” The immersive media standard can support a VR or an AR presentation in which the user can navigate and interact with the environment using 6 degrees of freedom (6 DoF), that include spatial navigation (x, y, z) and user head orientation (yaw, pitch, roll).

Figure 1:
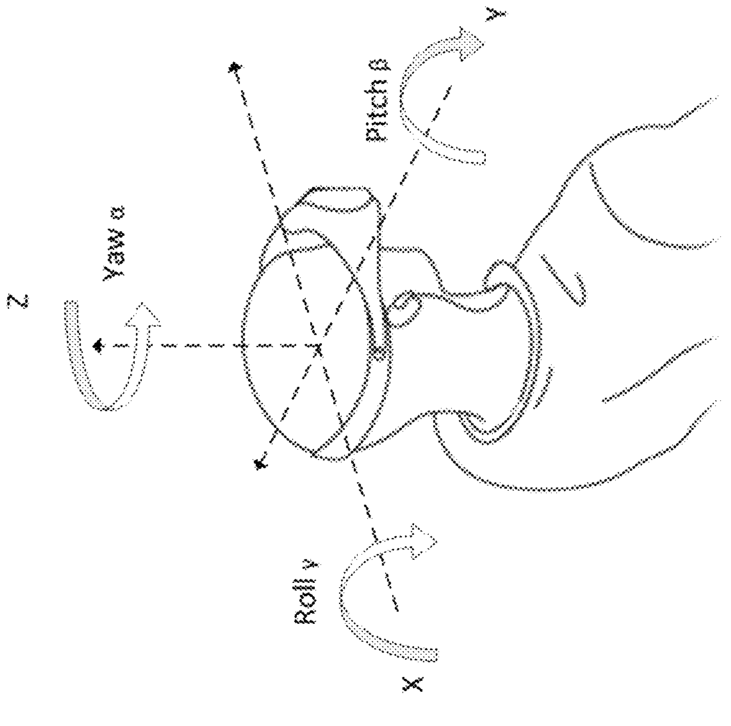
FIG. 1 shows a diagram illustrating an environment using 6 degrees of freedom (6 DoF) in some examples.

FIG. 1 shows a diagram illustrating an environment using 6 degrees of freedom (6 DoF) in some examples. The 6 degrees of freedom (6 DoF) can be represented by a spatial navigation (x, y, z) and a user head orientation (yaw, pitch, roll).

According to an aspect of the disclosure, immersive media can be used to impart the feeling that a user is actually present in the virtual world. In some examples, audio of a scene is perceived as in the real world, with sounds coming from associated visual figures. For example, sounds are perceived with the correct location and distance in the scene. Physical movement of the user in the real world is perceived as having matching movement in the scene of the virtual world. Further, the user can interact with the scene and cause sounds that are perceived as realistic and matching the user's experience in the real world.

Generally, a region of interest (ROI) includes samples within a data set identified for a particular purpose. The concept of a ROI can be used in many application areas, such as in medical imaging, geographical information systems, computer vision and optical character recognition, and the like.

In an audio scene, a space of interest can be described for a particular audio purpose. A space of interest of an audio scene can be associated with audio sources that can cause audio effects in the space of the audio scene. In some examples, a space of interest can be defined by an audio scene producer. The audio scene producer can define the space of interest in a 3 dimensional (3D) space and audio inputs as the audio sources that can cause audio effects in the space of interest. The audio inputs and the description of the space of interest can be provided to an audio encoder. The audio encoder can encode the audio inputs into a bitstream, and the space of interest can be included as metadata associated with the encoded audio. The bitstream can be provided to a client device. The client device can decode audio content from the bitstream and renders audio according to the space of interest. For example, when a game player moves in a virtual world into the space of interest, the audio content associated with the space of the interest is played.

Figure 2:
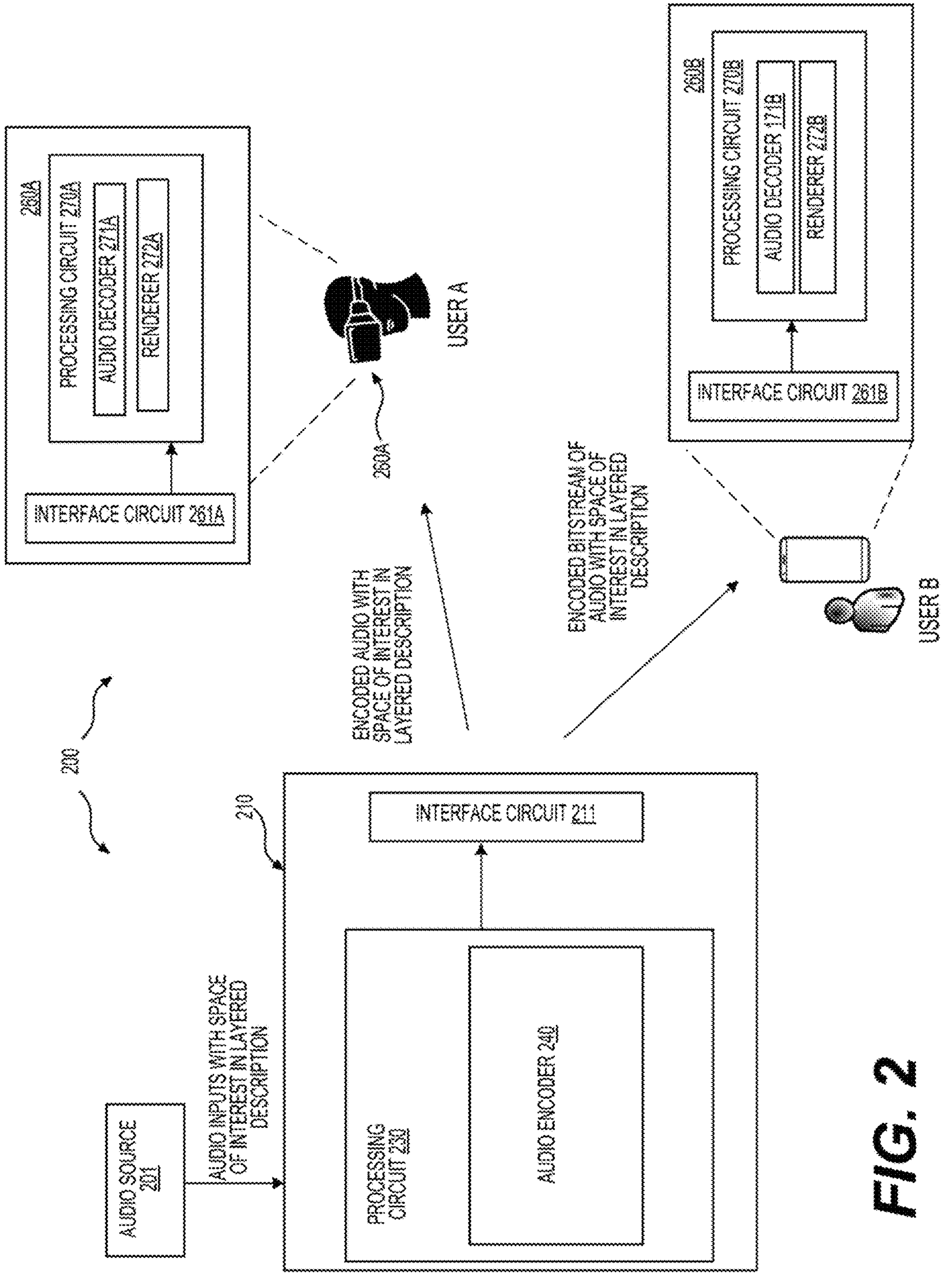
FIG. 2 shows a block diagram of a media system according to an embodiment of the disclosure.

FIG. 2 shows a block diagram of a media system (200) according to an embodiment of the disclosure. The media system (200) can be used in various use applications, such as immersive media application, augmented reality (AR) application, virtual reality application, video game application, sports game animation application, a teleconference and telepresence application, a media streaming application, and the like.

The media system (200) includes a media server device (210) and a plurality of media client devices, such as media client devices (260A) and (260B) shown in FIG. 2, that can be connected by a network (not shown). In an example, the media server device (210) can include one or more devices with audio coding and video coding functionalities. In an example, the media server device (210) includes a single computing device, such as a desktop computer, a laptop computer, a server computer, a tablet computer and the like. In another example, the media server device (210) includes data center(s), server farm(s), and the like. The media server device (210) can receive video and audio content, and compress the video content and audio content into one or more encoded bitstreams in accordance to suitable media coding standards. The encoded bitstreams can be delivered to the media client devices (260A) and (260B) via the network.

The media client devices (e.g., the media client devices (260A) and (260B)) respectively include one or more devices with video coding and audio coding functionality for media applications. In an example, each of the media client devices includes a computing device, such as a desktop computer, a laptop computer, a server computer, a tablet computer, a wearable computing device, a head mounted display (HMD) device, and the like. The media client device can decode the encoded bitstream in accordance to suitable media coding standards. The decoded video contents and audio contents can be used for media play.

The media server device (210) can be implemented using any suitable technology. In the FIG. 2 example, the media server device (210) includes a processing circuit (230) and an interface circuit (211) coupled together.

The processing circuit (230) can include any suitable processing circuitry, such as one or more central processing units (CPUs), one or more graphics processing units (GPUs), application specific integrated circuit, and the like. In the FIG. 2 example, the processing circuit (230) can be configured to include various encoders, such as an audio encoder (240), a video encoder (not shown), and the like. In an example, one or more CPUs and/or GPUs can execute software to function as the audio encoder (240). In another example, the audio encoder (240) can be implemented using application specific integrated circuits.

The interface circuit (211) can interface the media server device (210) with the network. The interface circuit (211) can include a receiving portion that receives signals from the network and a transmitting portion that transmits signals to the network. For example, the interface circuit (211) can transmit signals that carry the encoded bitstreams to other devices, such as the media client device (260A), the media client device (260B), and the like via the network. The interface circuit (211) can receive signals from the media client devices, such as the media client devices (260A) and (260B).

The network is suitably coupled with the media server device (210) and the media client devices (e.g., the media client devices (260A) and (260B)) via wired and/or wireless connections, such as Ethernet connections, fiber-optic connections, WiFi connections, cellular network connections and the like. The network can include network server devices, storage devices, network devices and the like. The components of the network are suitably coupled together via wired and/or wireless connections.

The media client devices (e.g., the media client devices (260A) and (260B)) are respectively configured to decode the coded bitstreams. In an example, each media client device can perform video decoding to reconstruct a sequence of video frames that can be displayed and can perform audio decoding to generate audio signals for playing.

The media client devices, such as the media client devices (260A) and (260B) can be implemented using any suitable technology. In the FIG. 2 example, the media client device (260A) is shown, but not limited to a head mounted display (HMD) with earphones as user equipment that can be used by user A, and the media client device (260B) is shown, but not limited to a smart phone that is used by user B.

In FIG. 2, the media client device (260A) includes an interface circuit (261A), and a processing circuit (270A) coupled together as shown in FIG. 2, and the media client device (260B) includes an interface circuit (261B), and a processing circuit (270B) coupled together as shown in FIG. 2.

The interface circuit (261A) can interface the media client device (260A) with the network. The interface circuit (261A) can include a receiving portion that receives signals from the network and a transmitting portion that transmits signals to the network. For example, the interface circuit (261A) can receive signals carrying data, such as signals carrying the encoded bitstream from the network.

The processing circuit (270A) can include suitable processing circuitry, such as CPU, GPU, application specific integrated circuits and the like. The processing circuit (270A) can be configured to include various components, such an audio decoder (271A), a renderer (272A), and the like.

In some examples, the audio decoder (271A) can decode audio content in an encoded bitstream by selecting a decoding tool suitable for a scheme by which the audio content was encoded. Further, the renderer (272A) can generate a final digital product suitable for the media client device (260A) from audio content decoded from the encoded bitstream. It is noted that the processing circuit (270A) can include other suitable components (not shown), such as mixer, post processing circuit, and the like for further audio processing.

Similarly, the interface circuit (261B) can interface the media client device (260B) with the network. The interface circuit (261B) can include a receiving portion that receives signals from the network and a transmitting portion that transmits signals to the network. For example, the interface circuit (261B) can receive signals carrying data, such as signals carrying the encoded bitstream from the network.

The processing circuit (270B) can include suitable processing circuitry, such as CPU, GPU, application specific integrated circuits and the like. The processing circuit (270B) can be configured to include various components, such an audio decoder (271B), a renderer (272B), and the like.

In some examples, the audio decoder (271B) can decode audio content in an encoded bitstream by selecting a decoding tool suitable for a scheme by which the audio content was encoded. Further, the renderer (272B) can generate a final digital product suitable for the media client device (260B) from audio content decoded from the encoded bitstream. It is noted that the processing circuit (270A) can include other suitable components (not shown), such as mixer, post processing circuit, and the like for further audio processing.

According to some aspects of the disclosure, a layered description of a space of interest in an audio scene is used in the media system (200). The media server device (210), the media client devices (e.g., the media client devices (260A) and (260B)) can process the layered description of the space of interest in the audio scene. For example, the processing circuit (230), the processing circuit (270A), the processing circuit (270B) and the like can determine the space of interest of the audio scene based on the layered description of the space of interest of the audio scene.

In some examples, the media server device (210) receives, for an audio scene, audio inputs and a layered description of a space of interest in the audio scene, from an audio source (201) (e.g., an audio injection server, an audio scene producer device, and the like). In some examples, the audio source (201) includes computing circuitry, such as a desktop computer, a laptop computer, a server computer, a tablet computer and the like. The computing circuitry can generate audio inputs for the audio scene and generate the layered description of the space of interest in the audio scene. The audio inputs for the audio scene and the layered description of the space of interest in the audio scene can be provided to the media server device (210).

In some embodiments, the media server device (210) can determine respective media content to send to the media client devices, encode the media content into bitstreams and send the bitstreams to the media client devices. In some examples, the media server device (210) can determine audio content for the media client device (260A) based on information provided by the media client device (260A), such as a scene information in an application (e.g., game scene, VR scene, and the like). The media server device (210) can determine the audio inputs for the scene (referred to as audio scene in term of audio processing) as the audio content. The media server device (210) can encode the audio content into a bitstream with other suitable information. In an example, the encoded audio content for the audio scene and the layered description of the space of interest of the audio scene can be carried by the bitstream. The layered description of the space of interest of the audio scene can be metadata for the audio content. The media server device (210) can send the bitstream to the media client device (260A). It is noted that the encoded audio content and the layered description of the space of interest of the audio scene can be sent separately in some examples.

When the media client device (260A) receives the encoded audio content and the layered description of the space of interest of the audio scene, the audio decoder (271A) can decode the audio content. The renderer (272A) can generate a final digital product suitable for the media client device (260A) from the audio content based on the space of interest of the audio scene. For example, when a subject in an application moves into the space of interest of the audio scene, the renderer (272A) can render the audio content. In an example, when the subject moves out of the space of interest, the audio content is ignored and not rendered.

In some examples, a space of interest may have an irregular shape. For ease of description, the space of interest can be descripted as a combination of a plurality of several areas (also referred to as subspaces) that are of regular shapes. Each of the several subspaces can be descripted using attributes. According to some aspects of the disclosure, some of these subspaces may share some attribute values. In some examples, a layered description of a space of interest of an audio scene can describe the shared attribute values of two or more subspaces in a separate layer from individual attribute values of the subspaces, thus the description of the space of interest can be more compact.

In the following description, rectangular boxes are used as subspaces of the regular shape for describing the space of interest. It is noted that other regular shape, such as sphere, cylinder, cube, and the like can be used in some examples.

Figure 3:
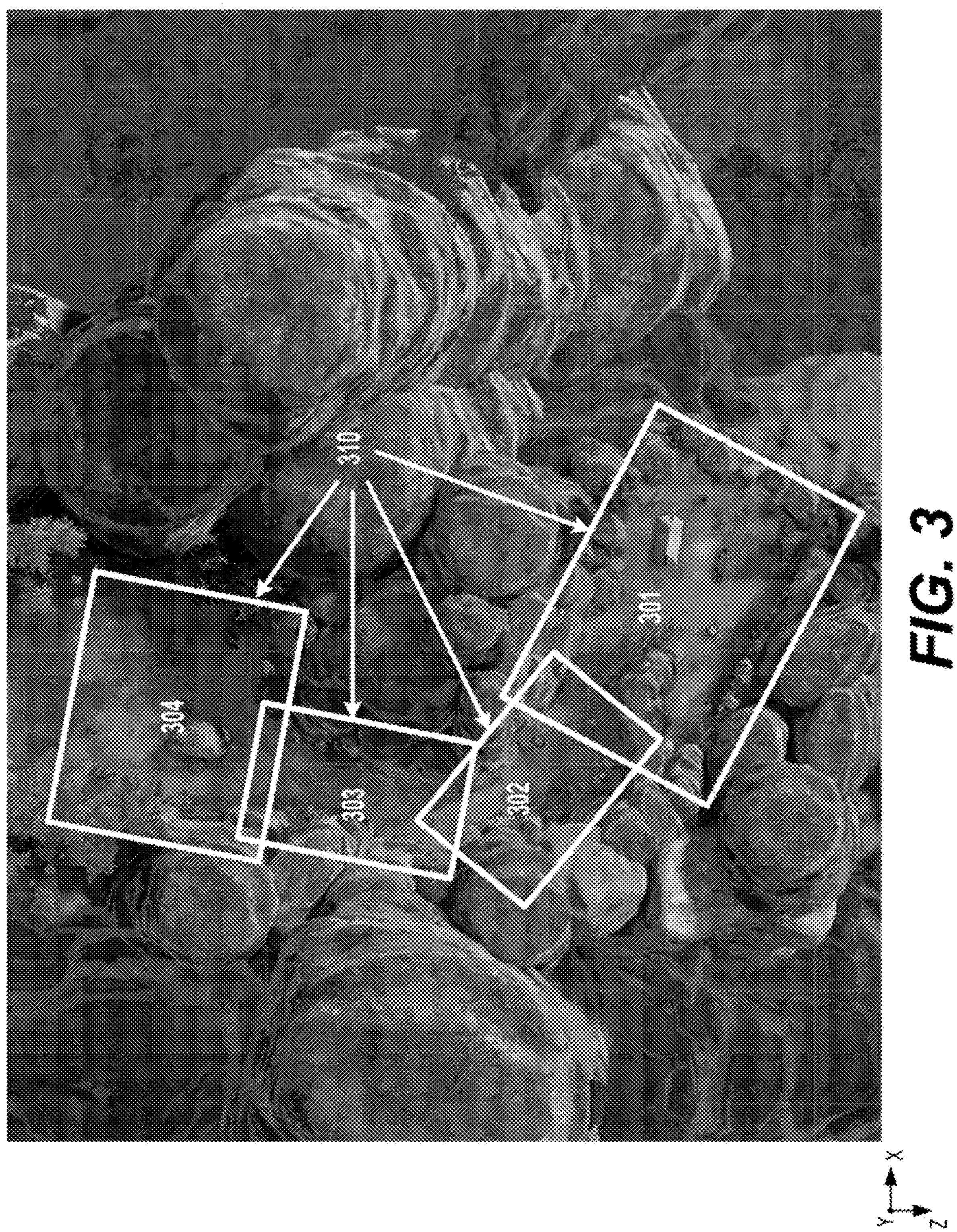
FIG. 3 shows an audio scene that is referred to as a canyon scene in some examples.

FIG. 3 shows an audio scene that is referred to as a canyon scene in some examples. In an audio scene, a space of interest can be specified by one or more rectangular boxes. In the FIG. 3 example, a space of interest (310) in the canyon scene can be described using four overlapping rectangular boxes (301)-(304).

In some examples, each rectangular box can be defined using 4 attributes: an identifier (id) attribute, a position attribute, an orientation attribute, and a size attribute.

The identifier attribute of a rectangular box can have a value that indicates the rectangular box. For example, the rectangular box (301) can be identified by an identifier "box:Box1"; the rectangular box (302) can be identified by an identifier "box:Box2"; the rectangular box (303) can be identified by an identifier "box:Box3"; and the rectangular box (304) can be identified by an identifier "box:Box4".

In some examples, the position attribute of a rectangular box can include three values corresponding to coordinates of the center position of the rectangular box in a 3D space, such as corresponding to x, y, z. In an example, the first value having an index of "1" corresponds to x coordinate of the center position, the second value having an index of "2" corresponds toy coordinate of the center position, and the third value having an index of "3" corresponds to z coordinate of the center position.

In some examples, the orientation attribute of a rectangular box can include three values corresponding to rotation angles along X-axis, Y-axis and Z-axis at the center position of the rectangular box. In an example, the first value having an index of "1" corresponds to a rotation angle along Y-axis at the center position of the rectangular box, the second value having an index of "2" corresponds to a rotation angle along X-axis at the center position of the rectangular box, and the third value having an index of "3" corresponds to a rotation angle along Z-axis at the center position of the rectangular box.

In some examples, the size attribute of a rectangular box can include three values corresponding to side lengths along X-axis, Y-axis and Z-axis. In an example, the first value having an index of "1" corresponds to side length of the rectangular box along X-axis, the second value having an index of "2" corresponds to side length of the rectangular box along Y-axis, and the third value having an index of "3" corresponds to side length of the rectangular box along Z-axis.

FIG. 4 shows a description (400) for the space of interest (310) in the canyon scene. The description (400) includes individual nodes respectively for the rectangular boxes (301)-(304). Specifically, the description (400) includes a description node (401) for the rectangular box (301), a description node (402) for the rectangular box (302), a description node (403) for the rectangular box (303), and a description node (404) for the rectangular box (304).

It is noted that the rectangular boxes (301)-(304) have same (common) attribute values that are separately listed in the individual nodes for the rectangular boxes (301)-(304).

Some aspects of the disclosure provide a layered description of a space of interest of an audio scene. The layered description can include a first layer for common attribute values and a second layer for uncommon attribute values. In the layered description, common attribute values of two or more subspaces (e.g., rectangular boxes) can be explicitly listed in the first layer. The common attribute values can be signaled once for all related description of subspaces. Other uncommon attribute values can be separately listed in the second layer. The layered description can be more compact that the description (400).

In some embodiments, the first layer of the description for common attribute values can be presented first, and followed by the second layer of description for uncommon attribute values of each individual rectangular box. The first layer of description can include one or more common nodes respectively describe common attribute values. The second layer of description can include individual nodes respectively for rectangular boxes. The common attribute values that are presented in the common nodes as common attribute values will not be listed again in the individual nodes for the rectangular boxes unless necessary, for example, with non-duplicated information. For each rectangular box of the space description, common attribute values that are already in the common nodes will not be listed. Instead, the rectangular box will share with the common attribute values listed in the common nodes by default.

Figure 5:
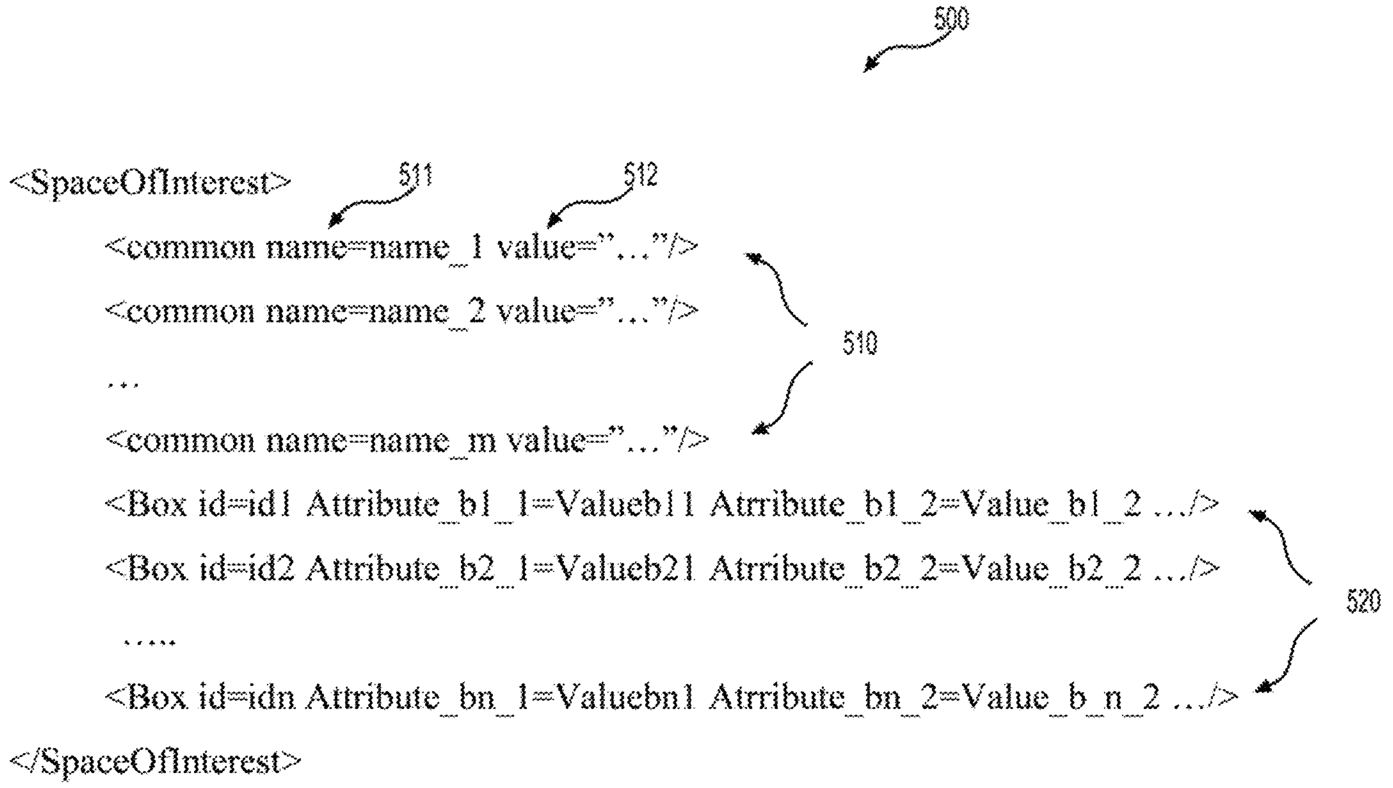
FIG. 5 shows a syntax for a layered description of a space of interest according to an embodiment of the disclosure.

FIG. 5 shows a syntax (500) for layered description of a space of interest according to an embodiment of the disclosure. The syntax includes a first layer (510) of description for common attribute values shared by two or more of the rectangular boxes, and a second layer (520) for description for uncommon attribute values of individual rectangular boxes.

The first layer (510) includes a plurality of common nodes. Each common node can include a name (e.g., shown by (511)) for identifying an attribute, and a value (e.g., shown by (512)) for the common attribute value.

In an example, four rectangular boxes of a space of interest have a same size, such as "20.0 2.50 15.0", and FIG. 6 shows a layered description (600) for the space of interest with four rectangular boxes of the same size using the syntax (500). The layered description (600) includes a first layer (610) of description for common nodes shared by two or more of the rectangular boxes, and a second layer (620) of description for uncommon attribute values of each individual rectangular box.

Specifically, the first layer (610) includes a common node. The common node has a name "size" (e.g., shown by (611)) for identifying the size attribute, and have a value (e.g., shown by (612)) of "20.0 2.50 15.0" for specifying the common attribute value that is the size of the rectangular boxes. The second layer (620) includes description for uncommon attribute values of each individual rectangular box, such as the position attribute and the orientation attribute. For example, the second layer (620) includes four individual nodes respectively for the four rectangular boxes.

In the FIG. 6 example, the individual nodes do not include the size attribute. The rectangular boxes that are identified by "box:Box1", "box:Box2", "box:Box3", "box:Box4" can refer to the common node to retrieve the size attribute value "20.0 2.50 15.0" for the size attribute.

In some examples, an attribute may have a plurality of subfields. For example, the size attribute of a rectangular box has a first subfield of a side length along X-axis, a second subfield of a side length along Y-axis, and a third subfield of a side length along Z-axis. In some examples, two or more rectangular boxes do not share the whole the size attribute, but can share one or more subfields of the size attribute.

In an example, in the canyon scene example of FIG. 3 and the description in FIG. 4, four rectangular boxes (301)-(304) of the space of interest (310) have the same height 2.5 (side length along Y-axis), which is the second subfield in the size attribute. In an example, the height information (side length along Y-axis) of the rectangular boxes (301)-(304) can be regarded as a common attribute (e.g., common subfield attribute) and can be signaled only once.

In another example, the four rectangular boxes (301)-(304) share some subfields of the orientation attribute. Specifically, the four rectangular boxes (301)-(304) share the second subfield value (e.g., "0") and the third subfield value (e.g., "0") of the orientation attribute. In an example, the second subfield and the third subfield of the orientation attribute can be regarded as common subfields of the orientation attribute and signaled once for all rectangular boxes (301)-(304).

In an embodiment, a layered description of the space of interest can include a first layer of description for common attribute values and/or common subfield attribute values, and a second layer of description for uncommon attribute values and/or uncommon subfield attribute values of individual rectangular boxes. For example, a common subfield of an attribute can be listed in a common node at the first layer (also referred to as parent level in an example). The common node can include a name of the attribute, an index for the common subfield, and value for the common subfield attribute value. In the layered description of the space of interest, for a rectangular box, if a subfield of an attribute is already listed in the common node, the subfield value of the attribute in the rectangular box will not be listed, in the second layer, in an individual node associated with the rectangular box. Instead, the attribute of the rectangular box will share with the common subfield attribute value listed in the common node by default in an example.

FIG. 7 shows a syntax (700) for a layered description of a space of interest according to an embodiment of the disclosure. The syntax includes a first layer (710) of description for common attribute values and/or common subfield attribute values shared by two or more of the rectangular boxes, and a second layer (720) for description for uncommon attribute values and/or uncommon subfield attribute values of individual rectangular boxes.

The first layer (710) includes a plurality of common nodes. Each common node can include a name (e.g., shown by (711)) for identifying an attribute, an index (e.g., shown by (713)) for identifying a subfield, and a value (e.g., shown by (712)) for the common subfield attribute value.

FIG. 8 shows a layered description (800) for the space of interest (310) with the four rectangular boxes (301)-(304) according to the syntax (700). The layered description (800) includes a first layer (810) of description for common nodes shared by two or more of the rectangular boxes, and a second layer (820) of description for uncommon attribute values and/or uncommon subfield attribute values of individual rectangular boxes.

Specifically, the first layer (810) includes a first common node for subfields of the orientation attribute, and a second common node for a subfield of the size attribute. The first common node has a name "orientation" (e.g., shown by (811)) for identifying the orientation attribute, has an index "2 3" (e.g., shown by (813)) for identifying the second subfield and the third subfield, and has a value "0.00 0.00" (e.g., shown by (812)) for specifying the common subfield attribute values. Thus, the first common node lists that the common value of the second subfield of the orientation attribute is "0.00", and the common value of the third subfield of the orientation is "0.00".

Similarly, the second common node has a name "size" for identifying the size attribute, has an index "2" for identifying the second subfield, and has a value of "2.50" for specifying the common subfield attribute value. Thus, the second common node list that the common value of the second subfield of the size attribute is "2.50".

The second layer (820) includes description for uncommon attribute values and/or uncommon subfield attribute values of individual rectangular boxes, such as the position attribute, the orientation attribute and the size attribute. In the FIG. 8 example, the second layer (820) includes four individual nodes respectively for the four rectangular boxes. The four rectangular boxes share the information in the common nodes. For each individual node, the orientation attribute includes the first subfield value, and does not include the second subfield value and the third subfield value. The second subfield value and the third subfield value of the orientation attribute can be retrieved from the first common node in the first layer (810).

Also in the second layer (820), for each individual node, the size attribute includes the first subfield value and the third subfield value and does not include the second subfield value. The second subfield value of the size attribute can be retrieved from the second common node in the first layer (810).

It is noted that, in the FIG. 8 example, the information in the first common node and the second common node is shared by all of the four rectangular boxes. In some embodiments, information in a common node of the first layer does not need to be shared by all of the individual nodes in the second layer.

In an embodiment, a layered description of the space of interest can include a first layer of description for common attribute values and/or common subfield attribute values shared by a subset of individual nodes for the subspaces (e.g., rectangular boxes), and a second layer of description for uncommon attribute values and/or uncommon subfield attribute values of individual subspaces (e.g., rectangular boxes). If a subspace does not share a common attribute value specified in the common nodes of the first layer, the individual node in the second layer and associated with the subspace can list an individual attribute value that is different from the common attribute value.

In the second layer, for a rectangular box, if an attribute value is the same as the listed in the common node, the attribute will not be listed; if an attribute value of a rectangular box is different from the common attribute, the rectangular box's attribute value can be listed.

In an example, the rectangular box (301) has a side length of "29.66" along the X-axis that is different from other three rectangular box (302)-(304) that have a side length of "19.23" along the X-axis.

FIG. 9 shows a layered description (900) for the space of interest (310) with the four rectangular boxes (301)-(304) according to the syntax (700). The layered description (900) includes a first layer (910) of description of common nodes for common attribute values shared by two or more of the rectangular boxes, and a second layer (920) of description of individual nodes for uncommon attribute values and/or uncommon subfield attribute values of individual rectangular boxes.

Specifically, the first layer (910) includes a first common node for subfields of the orientation attribute, and a second common node for subfields of the size attribute. The first common node has a name "orientation" for identifying the orientation attribute, has an index "2 3" for identifying the second subfield and the third subfield, and has a value "0.00 0.00" for specifying the common subfield attribute values. Thus, the first common node lists that the common value of the second subfield of the orientation attribute is "0.00", and the common value of the third subfield of the orientation is "0.00".

Further, the second common node has a name "size" for identifying the size attribute, has an index "1 2" for identifying the first subfield and the second subfield, and has a value of "19.23 2.50" for specifying the common subfield attribute values for a subset of the rectangular boxes, such as the rectangular boxes (302)-(304). Thus, the second common node list that the common values of the first subfield and second subfield of the size attribute are "19.23 2.50".

The second layer (920) includes description of individual nodes for uncommon attribute values and/or uncommon subfield attribute values of individual rectangular boxes, such as the position attribute, the orientation attribute and the size attribute. In the second layer (920), for each individual nodes, the orientation attribute includes the first subfield value, and does not include the second subfield value and the third subfield value. The second subfield value and the third subfield value of the orientation attribute can be retrieved from the first common node in the first layer.

In the second layer (920), for individual nodes associated with a subset of the rectangular boxes (e.g., box:Box2, box:Box3, and box:Box4), the size attribute includes the third subfield value and does not include the first subfield and the second subfield value. The first subfield value and second subfield value of the size attribute can be referred to the second common node in the first layer (910), and can be retrieved from the second common node in the first layer (910).

In the second layer (920), in the individual node for the rectangular box (e.g., box:Box1), the size attribute includes the first subfield value, the second subfield and the third subfield value. For example, the size attribute of the rectangular box "box:Box1" is listed with all three subfield values "29.66 2.50 20.47" as shown by (921). Thus, information in the individual node can overwrite the information in the common nodes.

In an embodiment, a layered description of the space of interest can include a first layer of description for common attribute values and/or common subfield attribute values shared by a subset of individual nodes for the subspaces (e.g., rectangular boxes), and a second layer of description for uncommon attribute values and/or uncommon subfield attribute values of individual subspaces (e.g., rectangular boxes). If a subspace does not share a common attribute value specified in the common nodes of the first layer, the individual node in the second layer and associated with the subspace can list a difference value that is a difference between an uncommon attribute value of the subspace and the common attribute value in the first layer.

In the second layer, for a rectangular box, if an attribute value is the same as listed in the common node, the attribute value will not be listed; if an attribute value of a rectangular box is different from the common attribute value, a difference between the rectangular box's attribute value and the common attribute value can be listed.

In an example, the rectangular box (301) has a side length of "29.66" along the X-axis that is different from other three rectangular box (302)-(304) that have a side length of "19.23" along the X-axis. The difference of the side length of "29.66" to the side length of "19.23" is "10.43".

FIG. 10 shows a layered description (1000) for the space of interest (310) with the four rectangular boxes (301)-(304) according to the syntax (700). The layered description (1000) includes a first layer (1010) of description for common nodes shared by two or more of the rectangular boxes, and a second layer (1020) of description for uncommon attribute values and/or uncommon subfield attribute values of individual rectangular boxes.

Specifically, the first layer (1010) includes a first common node for subfields of the orientation attribute, and a second common node for subfields of the size attribute. The first common node has a name "orientation" for identifying the orientation attribute, has an index "2 3" for identifying the second subfield and the third subfield, and has a value "0.00 0.00" for specifying the common subfield attribute value. Thus, the first common node lists that the common value of the second subfield of the orientation attribute is "0.00", and the common value of the third subfield of the orientation is "0.00".

Further, the second common node has a name "size" for identifying the size attribute, has an index "1 2" for identifying the first subfield and the second subfield, and has a value of "19.23 2.50" for specifying the common subfield attribute value for a subset of the rectangular boxes, such as the rectangular boxes (302)-(304). Thus, the second common node list that the common values of the first subfield and second subfield of the size attribute are "19.23 2.50".

The second layer (1020) includes description of individual nodes for uncommon attribute values and/or uncommon subfield attribute values of individual rectangular boxes, such as the position attribute, the orientation attribute and the size attribute. In the second layer (1020), in each individual node, the orientation attribute includes the first subfield value, and does not include the second subfield value and the third subfield value. The second subfield value and the third subfield value of the orientation attribute can be retrieved from the first common node in the first layer (1010).

In the second layer (1020), in the individual nodes for the subset of rectangular boxes (e.g., box:Box2, box:Box3, and box:Box4), the size attribute includes the third subfield value and does not include the first subfield and the second subfield value. The first subfield value and second subfield value of the size attribute can be referred to the second common node in the first layer (1010), and can be retrieved from the second common node in the first layer (1010).

In the second layer (1020), in the individual node associated with the rectangular box (e.g., box:Box1), the size attribute includes a first subfield difference value, a second subfield difference value and the third subfield value. For example, the size attribute of the rectangular box "box: Box1" is listed as "10.43 0.00 20.47" as shown by (1021). By checking with the second common node, the first subfield value of the size attribute of "box:Box1" can be restored to a sum of "19.23" and "10.43" which is equal to 29.66, and the second subfield value of the size attribute of "box:Box1" can be restored to a sum of "2.5" and "0" which is equal to 2.5.

Figure 11:
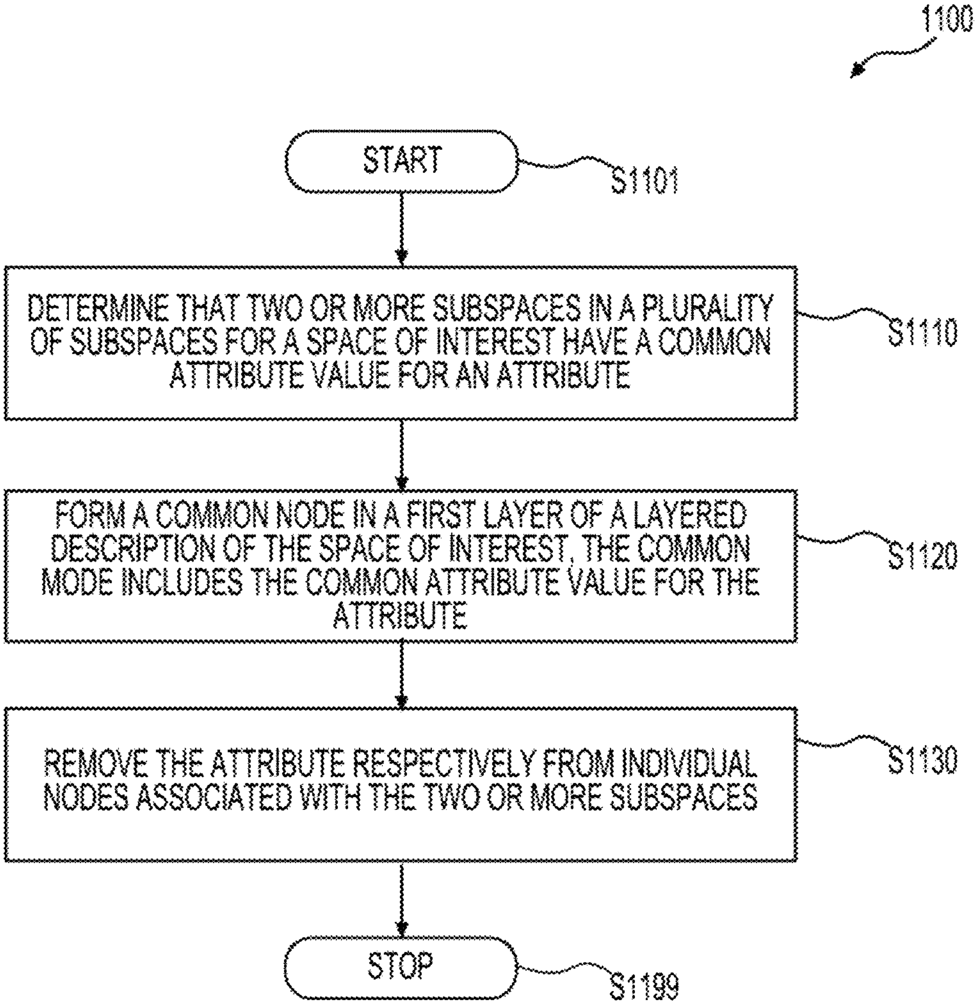
FIG. 11 shows a flow chart outlining a process according to some embodiment of the disclosure.

FIG. 11 shows a flow chart outlining a process (1100) according to an embodiment of the disclosure. The process (1100) can be performed by an audio source device, such as the audio source device (201). In some embodiments, the process (1100) is implemented in software instructions, thus when the processing circuitry executes the software instructions, the processing circuitry performs the process (1100). The process starts at (S1101) and proceeds to (S1110).

At (S1110), two or more subspaces in a plurality of subspaces for a space of interest are determined having a common attribute value for an attribute.

In some examples, the plurality of subspaces are rectangular boxes. Each rectangular box can be defined by at least a position attribute, an orientation attribute and a size attribute.

At (S1120), a common node is formed in a first layer of a layered description of the space of interest. The common mode includes the common attribute value for the attribute.

At (S1130), the attribute is removed respectively from individual nodes associated with the two or more subspaces. The individual nodes are in a second layer of the layered description of the space of interest.

In an example, the common node identifies a name for an attribute, and the common attribute value. The common attribute value can be removed from the individual nodes associated with the two or more subspaces.

In another example, the common node identifies a name of an attribute, an index of a subfield of the attribute and the common attribute value as a common subfield attribute value. The common subfield attribute value can be removed from the individual nodes associated with the two or more subspaces.

In some examples, the common node is common to the plurality of subspaces. The common attribute value can be removed from each of the individual nodes associated with the plurality of subspaces.

In some examples, the common node is common to a subset of the plurality of subspaces. The common attribute value can be removed from each of individual nodes associated with the subset of the plurality of subspaces. For a subspace that is not in the subset, an individual node associated with the subset can include a different attribute value from the common attribute value for the attribute.

In some examples, the common node is common to a subset of the plurality of subspaces. The common attribute value can be removed from each of individual nodes associated with the subset of the plurality of subspaces. For a subspace that is not in the subset, an individual node associated with the subset can include a difference value of a specific attribute value (of the subspace) to the common attribute value for the attribute.

Then, the process proceeds to (S1199) and terminates.

The process (1100) can be suitably adapted. Step(s) in the process (1100) can be modified and/or omitted. Additional step(s) can be added. Any suitable order of implementation can be used.

Figure 12:
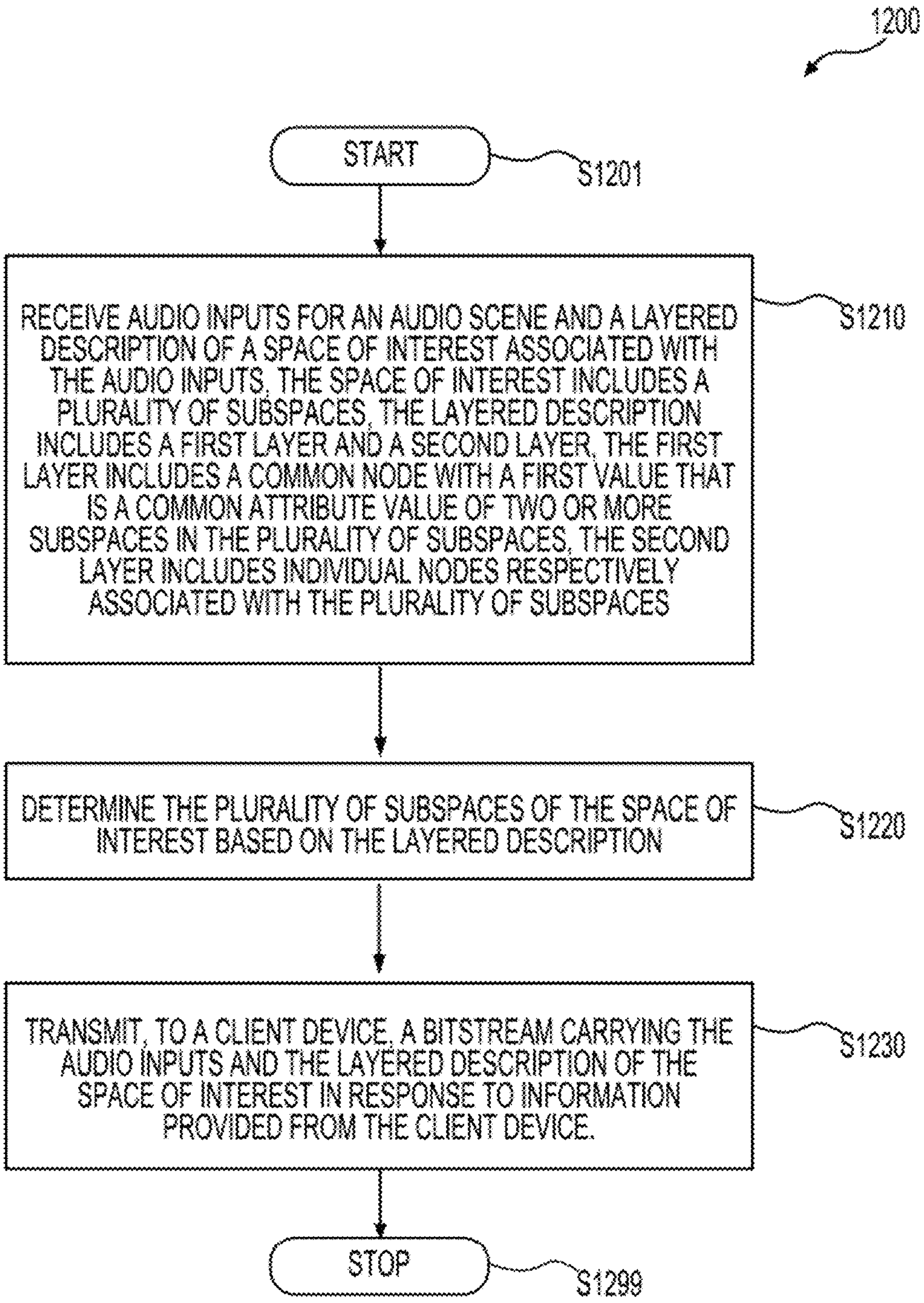
FIG. 12 shows a flow chart outlining a process according to some embodiment of the disclosure.

FIG. 12 shows a flow chart outlining a process (1200) according to an embodiment of the disclosure. The process (1200) can be performed by a media server device, such as the media server device (210). In some embodiments, the process (1200) is implemented in software instructions, thus when the processing circuitry executes the software instructions, the processing circuitry performs the process (1200). The process starts at (S1201) and proceeds to (S1210).

At (S1210), audio inputs for an audio scene and a layered description of a space of interest associated with the audio inputs are received. The space of interest includes a plurality of subspaces. The layered description includes a first layer and a second layer. The first layer includes a common node with a first value that is a common attribute value of two or more subspaces in the plurality of subspaces. The second layer includes individual nodes respectively associated with the plurality of subspaces.

In some examples, the plurality of subspaces are rectangular boxes. Each rectangular box can be defined by at least a position attribute, an orientation attribute and a size attribute.

At (S1220), the plurality of subspaces of the space of interest are determined based on the layered description.

In an example, the common node identifies a name for an attribute, and the first value is an attribute value of the attribute. The first value can be retrieved from the common node in the first layer as the attribute value of the attribute for a subspace in the plurality of subspaces.

In another example, the common node identifies a name of an attribute and an index of a subfield of the attribute and the first value is a subfield attribute value for the subfield of the attribute. The first value can be retrieved from the common node in the first layer as the subfield attribute value for the subfield of the attribute of a subspace in the plurality of subspaces.

In some examples, the common node with the first value is common to the plurality of subspaces. The first value can be retrieved from the common node in the first layer as an attribute value of an attribute for each of the plurality of subspaces.

In some examples, the common node with the first value is common to a subset of the plurality of subspaces. The first value is retrieved, from the common node in the first layer, as an attribute value of an attribute for a first subspace in response to a first individual node associated with the first subspace missing a value for the attribute. Further, a second value associated with the attribute of a second subspace is retrieved, from a second individual node associated with a second subspace in response to an existence of the second value associated with the attribute in the second individual node.

In some examples, the common node with the first value is common to a subset of the plurality of subspaces. The first value is retrieved, from the common node in the first layer as an attribute value of an attribute of a first subspace in response to a first individual node associated with the first subspace missing a value for the attribute. Further, a difference value with the attribute of a second subspace is retrieved, from a second individual node associated with the second subspace. Then, a second value for the attribute of the second subspace is computed based on the first value and the difference value, such as a sum of the first value and the difference value.

At (S1230), a bitstream carrying the audio inputs and the layered description of the space of interest is transmitted to a client device in response to information provided from the client device. In an example, the information provided from the client device indicates a scene change to the audio scene. In another example the information provided from the client device indicate a movement by a subject in an application being associated with the space of interest, such as moving into the space of interest, and the like.

Then, the process proceeds to (S1299) and terminates.

The process (1200) can be suitably adapted. Step(s) in the process (1200) can be modified and/or omitted. Additional step(s) can be added. Any suitable order of implementation can be used.

Figure 13:
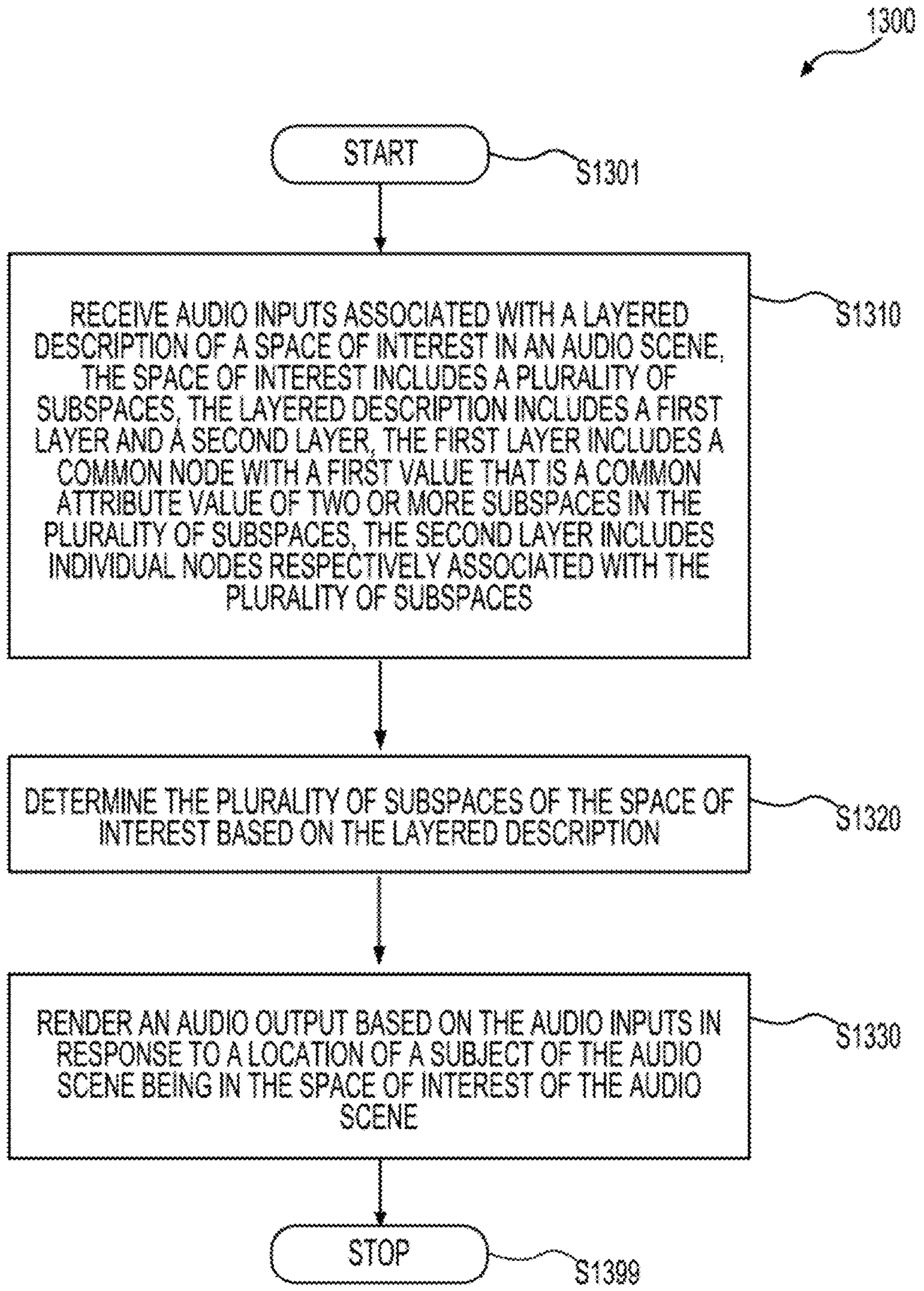
FIG. 13 shows a flow chart outlining a process according to some embodiment of the disclosure.

FIG. 13 shows a flow chart outlining a process (1300) according to an embodiment of the disclosure. The process (1300) can be performed by a media client device, such as the media client device (260A), the media client device (260B), and the like. In some embodiments, the process (1300) is implemented in software instructions, thus when the processing circuitry executes the software instructions, the processing circuitry performs the process (1300). The process starts at (S1301) and proceeds to (S1310).

At (S1310), audio inputs associated with a layered description for a space of interest in an audio scene are received. The space of interest includes a plurality of subspaces. The layered description includes a first layer and a second layer. The first layer has a common node with a first value that is a common attribute value of two or more subspaces in the plurality of subspaces. The second layer has individual nodes respectively associated with each of the plurality of subspaces.

In some examples, a bitstream carrying the audio inputs and the layered description of the space of interest (e.g., as metadata of the audio inputs) is received. The bitstream is decoded to obtain the audio inputs and the layered description of the space of interest.

In some examples, the plurality of subspaces are rectangular boxes. Each rectangular box can be defined by at least a position attribute, an orientation attribute and a size attribute.

At (S1320), the plurality of subspaces of the space of interest are determined based on the layered description.

In an example, the common node identifies a name for an attribute, and the first value is an attribute value of the attribute. The first value can be retrieved from the common node in the first layer as the attribute value of the attribute for a subspace in the plurality of subspaces.

In another example, the common node identifies a name of an attribute and an index of a subfield of the attribute and the first value is a subfield attribute value for the subfield of the attribute. The first value can be retrieved from the common node in the first layer as the subfield attribute value for the subfield of the attribute of a subspace in the plurality of subspaces.

In some examples, the common node with the first value is common to the plurality of subspaces. The first value can be retrieved from the common node in the first layer as an attribute value of an attribute for each of the plurality of subspaces.

In some examples, the common node with the first value is common to a subset of the plurality of subspaces. The first value is retrieved, from the common node in the first layer, as an attribute value of an attribute for a first subspace in response to a first individual node associated with the first subspace missing a value for the attribute. Further, a second value associated with the attribute of a second subspace is retrieved, from a second individual node associated with a second subspace in response to an existence of the second value associated with the attribute in the second individual node.

In some examples, the common node with the first value is common to a subset of the plurality of subspaces. The first value is retrieved, from the common node in the first layer as an attribute value of an attribute of a first subspace in response to a first individual node associated with the first subspace missing a value for the attribute. Further, a difference value with the attribute of a second subspace is retrieved, from a second individual node associated with the second subspace. Then, a second value for the attribute of the second subspace is computed based on the first value and the difference value.

At (S1330), an audio output is rendered based on the audio inputs in response to a location of a subject of the audio scene being in the space of interest. For example, the audio scene corresponds to a gaming scene in a gaming application, and the subject of the audio scene is a game player in the gaming application. The audio output can be rendered in response to the game player moving into the space of interest of the gaming scene. In some examples, the audio inputs can be ignored without rendering in response to the location of the subject of the audio scene being outside of the space of interest.

Then, the process proceeds to (S1399) and terminates.

The process (1300) can be suitably adapted. Step(s) in the process (1300) can be modified and/or omitted. Additional step(s) can be added. Any suitable order of implementation can be used.

The techniques described above, can be implemented as computer software using computer-readable instructions and physically stored in one or more computer-readable media. For example, FIG. 14 shows a computer system (1400) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 14:
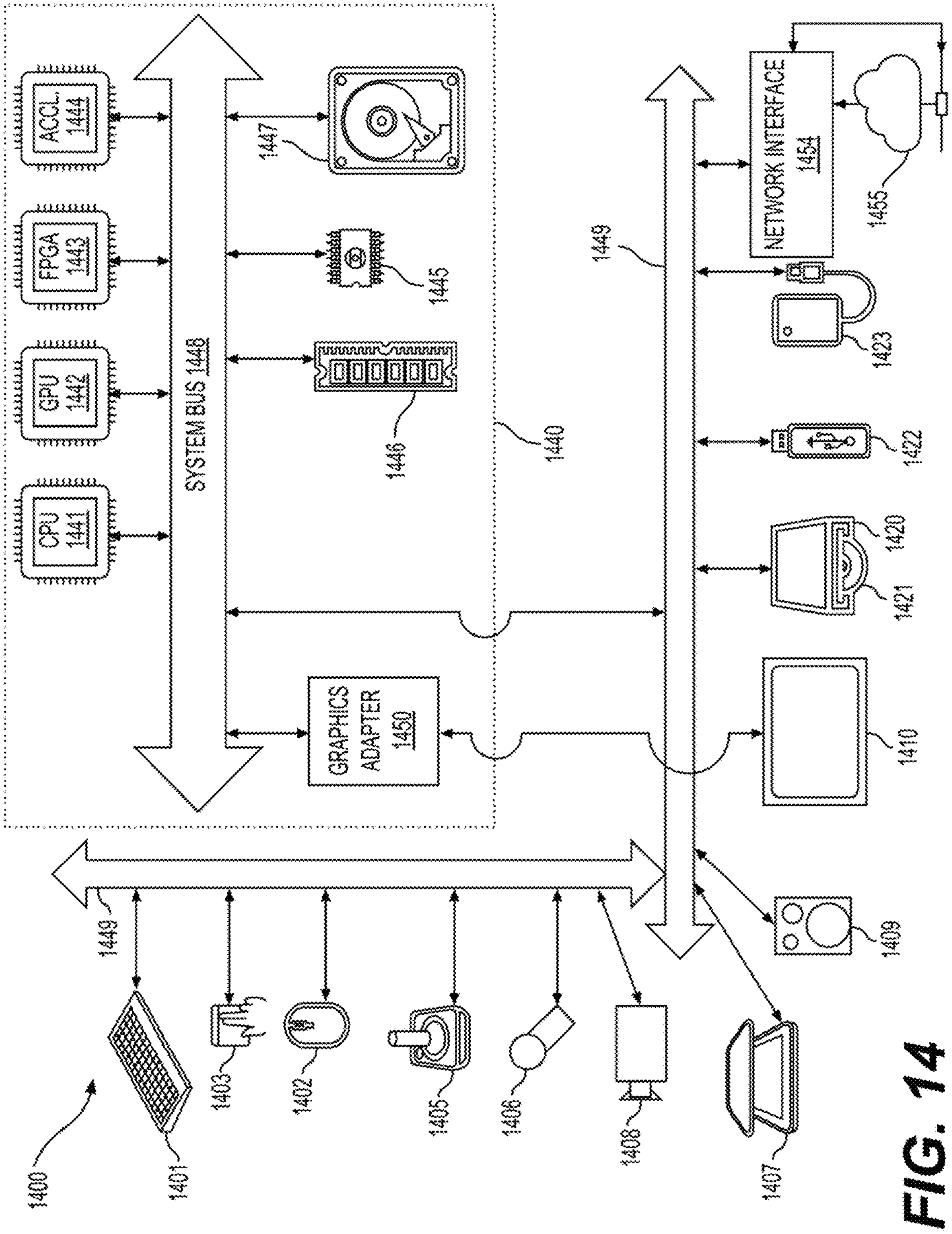
FIG. 14 is a schematic illustration of a computer system in accordance with an embodiment.

The components shown in FIG. 14 for computer system (1400) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1400).

Computer system (1400) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1401), mouse (1402), trackpad (1403), touch screen (1410), data-glove (not shown), joystick (1405), microphone (1406), scanner (1407), camera (1408).

Computer system (1400) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1410), data-glove (not shown), or joystick (1405), but there can also be tactile feedback devices that do not serve as input devices), audio output devices (such as: speakers (1409), headphones (not depicted)), visual output devices (such as screens (1410) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1400) can also include human accessible storage devices and their associated media such as optical media including CD/DVD ROM/RW (1420) with CD/DVD or the like media (1421), thumb-drive (1422), removable hard drive or solid state drive (1423), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1400) can also include an interface (1454) to one or more communication networks (1455). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1449) (such as, for example USB ports of the computer system (1400)); others are commonly integrated into the core of the computer system (1400) by attachment to a system bus as described below (for example Ethernet interface into a PC computer system or cellular network interface into a smartphone computer system). Using any of these networks, computer system (1400) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1440) of the computer system (1400).

The core (1440) can include one or more Central Processing Units (CPU) (1441), Graphics Processing Units (GPU) (1442), specialized programmable processing units in the form of Field Programmable Gate Areas (FPGA) (1443), hardware accelerators for certain tasks (1444), graphics adapters (1450), and so forth. These devices, along with Read-only memory (ROM) (1445), Random-access memory (1446), internal mass storage such as internal non-user accessible hard drives, SSDs, and the like (1447), may be connected through a system bus (1448). In some computer systems, the system bus (1448) can be accessible in the form of one or more physical plugs to enable extensions by additional CPUs, GPU, and the like. The peripheral devices can be attached either directly to the core's system bus (1448), or through a peripheral bus (1449). In an example, the screen (1410) can be connected to the graphics adapter (1450). Architectures for a peripheral bus include PCI, USB, and the like.

CPUs (1441), GPUs (1442), FPGAs (1443), and accelerators (1444) can execute certain instructions that, in combination, can make up the aforementioned computer code. That computer code can be stored in ROM (1445) or RAM (1446). Transitional data can be also be stored in RAM (1446), whereas permanent data can be stored for example, in the internal mass storage (1447). Fast storage and retrieve to any of the memory devices can be enabled through the use of cache memory, that can be closely associated with one or more CPU (1441), GPU (1442), mass storage (1447), ROM (1445), RAM (1446), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1400), and specifically the core (1440) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1440) that are of non-transitory nature, such as core-internal mass storage (1447) or ROM (1445). The software implementing various embodiments of the present disclosure can be stored in such devices and executed by core (1440). A computer-readable medium can include one or more memory devices or chips, according to particular needs. The software can cause the core (1440) and specifically the processors therein (including CPU, GPU, FPGA, and the like) to execute particular processes or particular parts of particular processes described herein, including defining data structures stored in RAM (1446) and modifying such data structures according to the processes defined by the software. In addition or as an alternative, the computer system can provide functionality as a result of logic hardwired or otherwise embodied in a circuit (for example: accelerator (1444)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of media processing in a device, comprising:

receiving audio inputs associated with a layered description for a space of interest in an audio scene, the space of interest comprising a plurality of subspaces, the layered description comprising a first layer and a second layer, the first layer having a common node with a first value that is a common attribute value of two or more subspaces in the plurality of subspaces, and the second layer having individual nodes respectively associated with each of the plurality of subspaces;

determining, by a processor of the device, the plurality of subspaces of the space of interest based on the layered description; and rendering, by the processor, an audio output based on the audio inputs in response to a location of a subject of the audio scene being in the space of interest.

2. The method of claim 1, wherein the plurality of subspaces are rectangular boxes that are defined by at least a position attribute, an orientation attribute and a size attribute.

3. The method of claim 1, wherein the common node identifies a name for an attribute, and the first value is an attribute value of the attribute, and the determining the plurality of subspaces comprises:

retrieving, from the common node in the first layer, the first value as the attribute value of the attribute for a subspace in the plurality of subspaces.

4. The method of claim 1, wherein the common node identifies a name of an attribute and an index of a subfield of the attribute, and the first value is a subfield attribute value for the subfield of the attribute, and the determining the plurality of subspaces comprises:

retrieving, from the common node in the first layer, the first value as the subfield attribute value for the subfield of the attribute of a subspace in the plurality of subspaces.

5. The method of claim 1, wherein the common node with the first value is common to the plurality of subspaces, and the determining the plurality of subspaces further comprises:

retrieving, from the common node in the first layer, the first value as an attribute value of an attribute for each of the plurality of subspaces.

6. The method of claim 1, wherein the common node with the first value is common to a subset of the plurality of subspaces, and the determining the plurality of subspaces further comprises:

retrieving, from the common node in the first layer, the first value as an attribute value of an attribute for a first subspace in response to a first individual node associated with the first subspace missing a value for the attribute; and retrieving, from a second individual node associated with a second subspace, a second value associated with the attribute for the second subspace in response to an existence of the second value associated with the attribute in the second individual node.

7. The method of claim 1, wherein the common node with the first value is common to a subset of the plurality of subspaces, and the determining the plurality of subspaces further comprises:

retrieving, from the common node in the first layer, the first value as an attribute value of an attribute of a first subspace in response to a first individual node associated with the first subspace missing a value for the attribute;

retrieving, from a second individual node associated with a second subspace, a difference value associated with the attribute of the second subspace; and computing a second value for the attribute of the second subspace based on the first value and the difference value.

8. The method of claim 1, further comprising:

receiving a bitstream carrying the audio inputs and the layered description of the space of interest as metadata of the audio inputs; and decoding the bitstream to obtain the audio inputs and the layered description of the space of interest.

9. The method of claim 1, further comprising:

ignoring the audio inputs without rendering in response to the location of the subject of the audio scene being outside of the space of interest.

10. An apparatus of media processing, comprising processing circuitry configured to:

receive audio inputs associated with a layered description for a space of interest in an audio scene, the space of interest comprising a plurality of subspaces, the layered description comprising a first layer and a second layer, the first layer having a common node with a first value that is a common attribute value of two or more subspaces in the plurality of subspaces, and the second layer having individual nodes respectively associated with each of the plurality of subspaces;

determine the plurality of subspaces of the space of interest based on the layered description; and render an audio output based on the audio inputs in response to a location of a subject of the audio scene being in the space of interest.

11. The apparatus of claim 10, wherein the plurality of subspaces are rectangular boxes that are defined by at least a position attribute, an orientation attribute and a size attribute.

12. The apparatus of claim 10, wherein the common node identifies a name for an attribute, and the first value is an attribute value of the attribute, and the processing circuitry is configured to:

retrieve, from the common node in the first layer, the first value as the attribute value of the attribute for a subspace in the plurality of subspaces.

13. The apparatus of claim 10, wherein the common node identifies a name of an attribute and an index of a subfield of the attribute, and the first value is a subfield attribute value for the subfield of the attribute, and the processing circuitry is configured to:

retrieve, from the common node in the first layer, the first value as the subfield attribute value for the subfield of the attribute of a subspace in the plurality of subspaces.

14. The apparatus of claim 10, wherein the common node with the first value is common to the plurality of subspaces, and the processing circuitry is configured to:

retrieve, from the common node in the first layer, the first value as an attribute value of an attribute for each of the plurality of subspaces.

15. The apparatus of claim 10, wherein the common node with the first value is common to a subset of the plurality of subspaces, and the processing circuitry is configured to:

retrieve, from the common node in the first layer, the first value as an attribute value of an attribute for a first subspace in response to a first individual node associated with the first subspace missing a value for the attribute; and retrieve, from a second individual node associated with a second subspace, a second value associated with the attribute for the second subspace in response to an existence of the second value associated with the attribute in the second individual node.

16. The apparatus of claim 10, wherein the common node with the first value is common to a subset of the plurality of subspaces, and the processing circuitry is configured to:

retrieve, from the common node in the first layer, the first value as an attribute value of an attribute of a first subspace in response to a first individual node associated with the first subspace missing a value for the attribute;

retrieve, from a second individual node associated with a second subspace, a difference value associated with the attribute of the second subspace; and compute a second value for the attribute of the second subspace based on the first value and the difference value.

17. The apparatus of claim 10, wherein the processing circuitry is configured to:

receive a bitstream carrying the audio inputs and the layered description of the space of interest as metadata of the audio inputs; and decode the bitstream to obtain the audio inputs and the layered description of the space of interest.

18. The apparatus of claim 10, wherein the processing circuitry is configured to:

ignore the audio inputs without rendering in response to the location of the subject of the audio scene being outside of the space of interest.

19. A non-transitory computer-readable storage medium storing instructions which when executed by at least one processor cause the at least one processor to perform:

receiving audio inputs associated with a layered description for a space of interest in an audio scene, the space of interest comprising a plurality of subspaces, the layered description comprising a first layer and a second layer, the first layer having a common node with a first value that is a common attribute value of two or more subspaces in the plurality of subspaces, and the second layer having individual nodes respectively associated with each of the plurality of subspaces;

determining the plurality of subspaces of the space of interest based on the layered description; and rendering an audio output based on the audio inputs in response to a location of a subject of the audio scene being in the space of interest.

20. The non-transitory computer-readable storage medium of claim 19, wherein the plurality of subspaces are rectangular boxes that are defined by at least a position attribute, an orientation attribute and a size attribute.

* * * * *